Patented Mar. 6, 1945

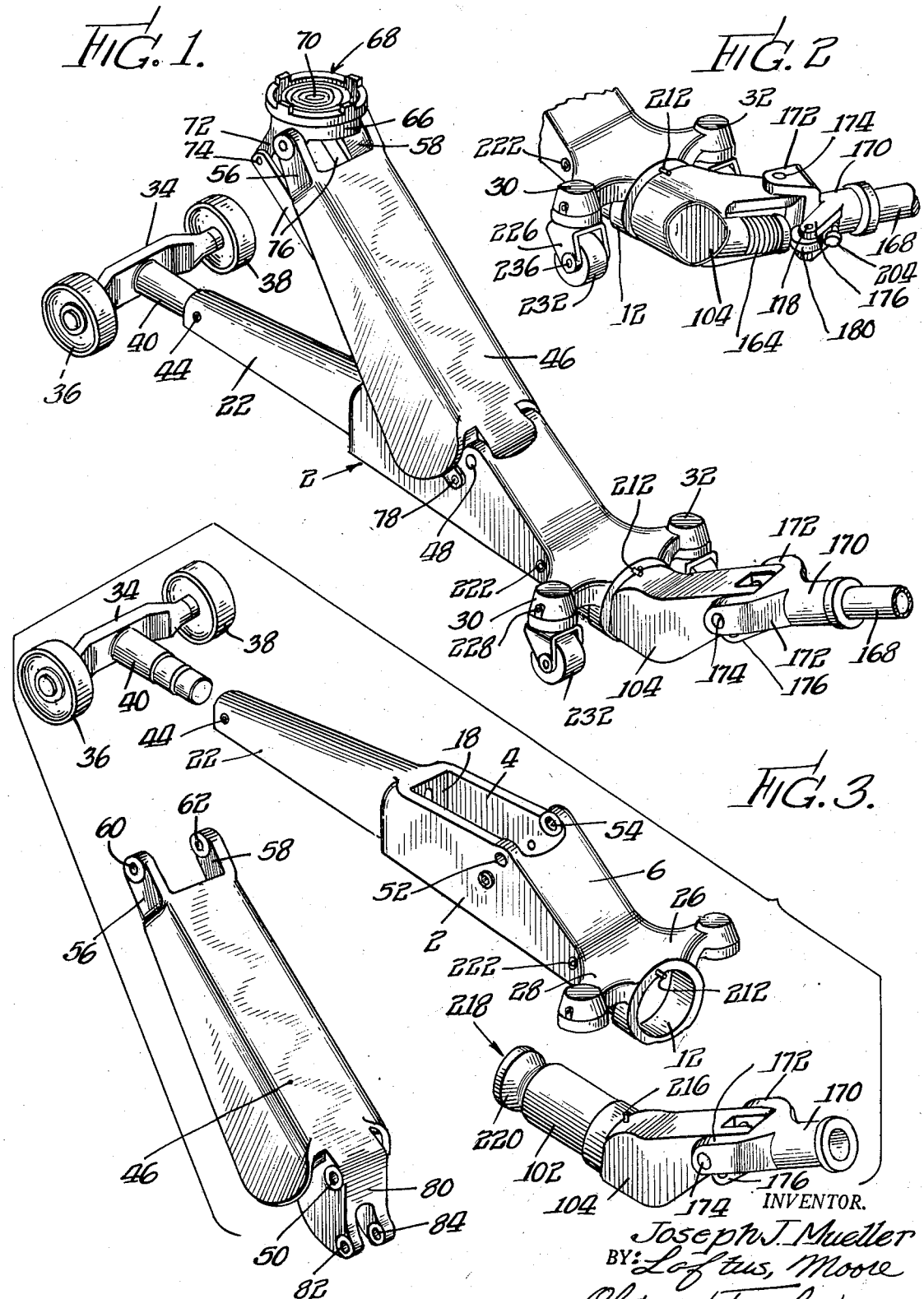

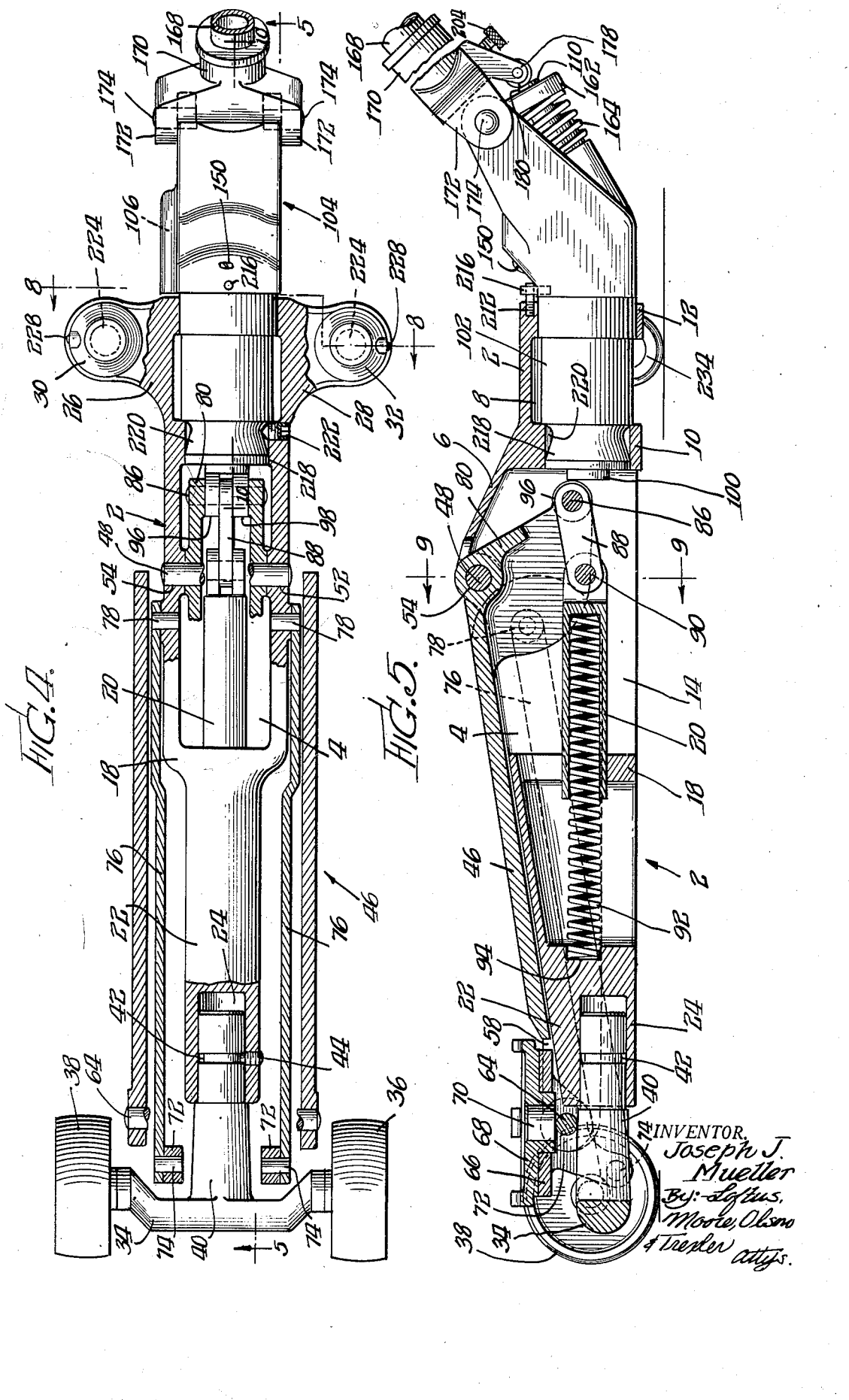

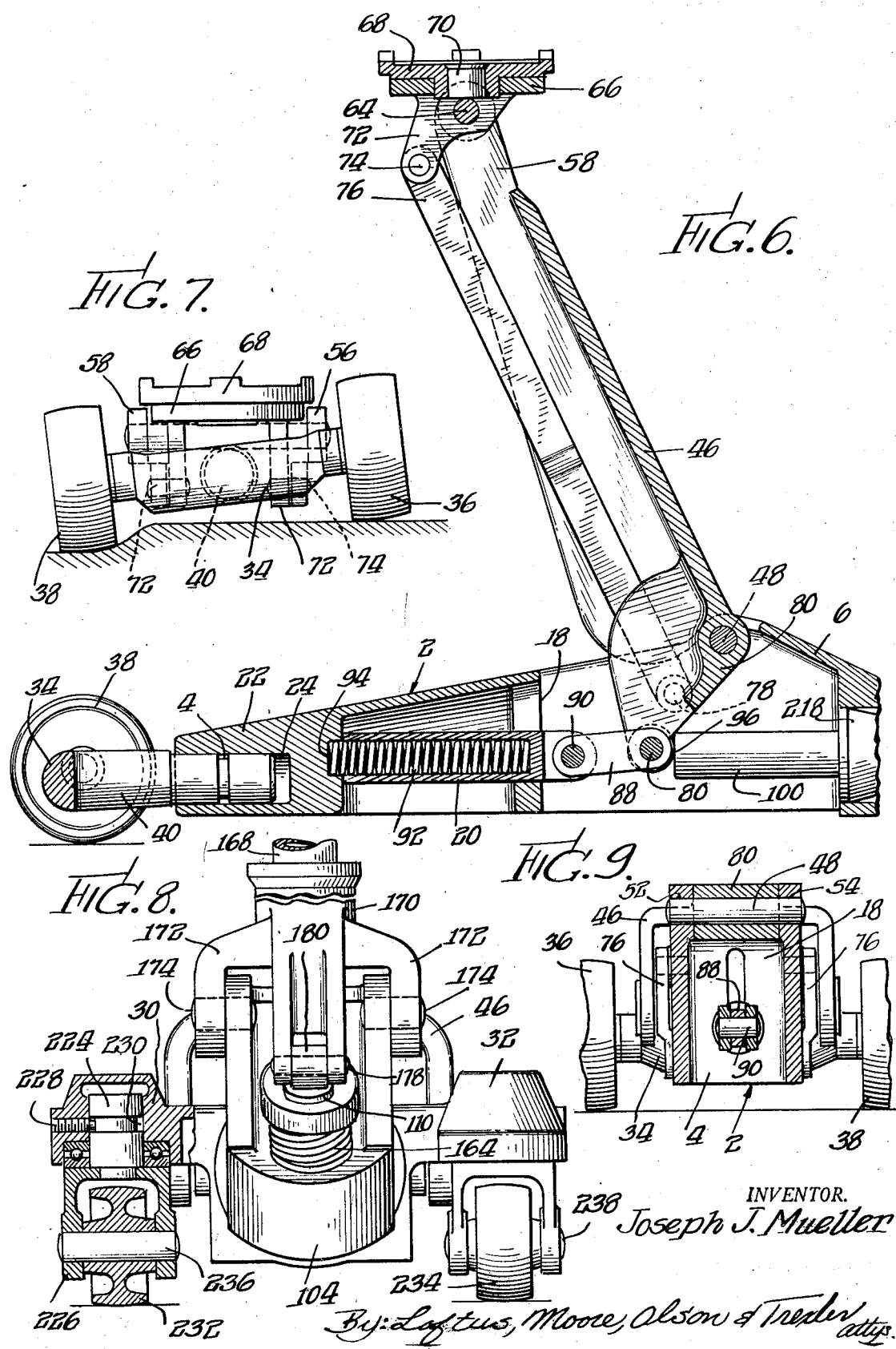

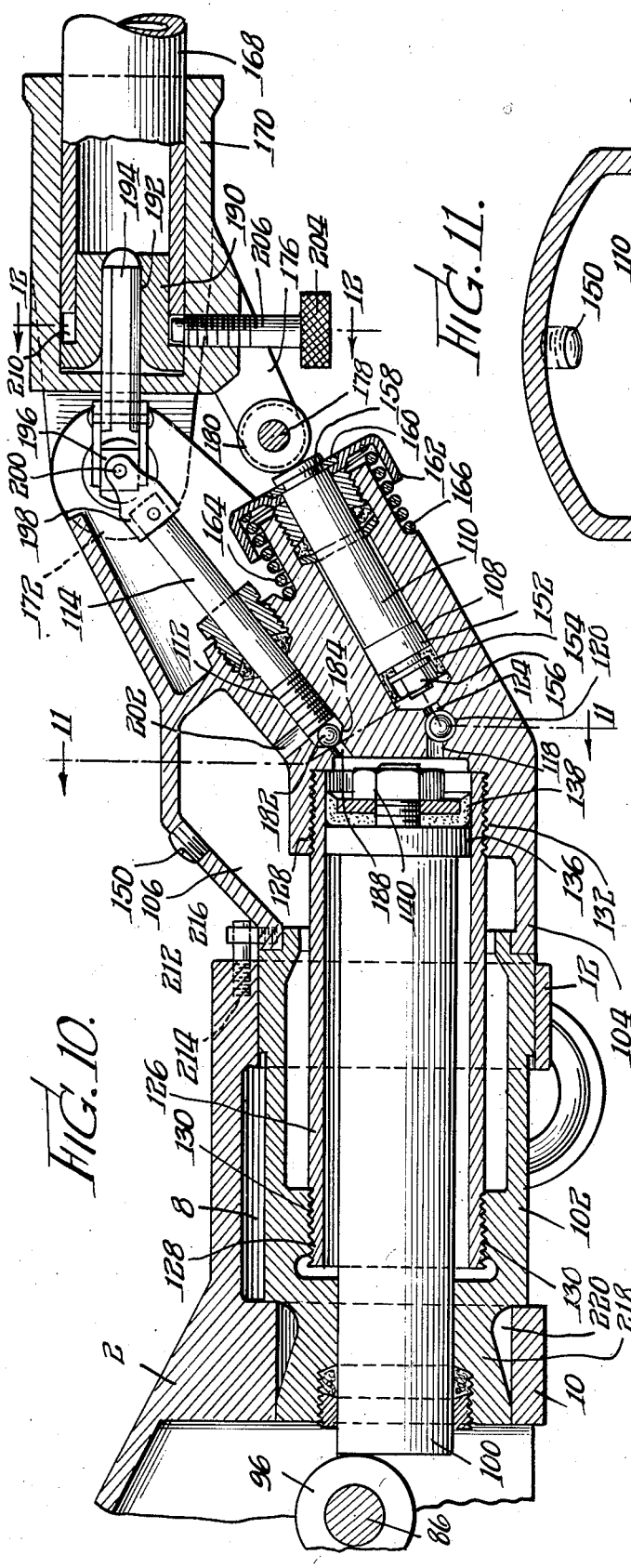

2,370,681

UNITED STATES PATENT OFFICE 2,370,681

AUTOMOBILE JACK

Joseph J. Mueller, St. Joseph, Mich., assignor to Auto Specialties Manufacturing Company, St. Joseph, Mich., a corporation of Michigan Application June 24, 1943, Serial No. 492,006

27 Claims. (Cl. 254—10)

This invention relates to the type of jack known in the commercial literature by the following trade names: wheel type jack, truck jack, service jack, floor jack, and garage jack. In general it comprises a low, horizontally disposed, elongated jack chassis mounted on, generally, four wheels so that it can be rolled along the garage floor or elsewhere, and includes a load carrying member shiftably mounted with respect to the chassis and capable of being actuated to a raised position to raise the load. In addition, this type includes a generally elongated actuator and mechanism operable thereby to raise the load carrying member. Generally through the operation of a control member additional means, often including a spring, is provided for lowering the load carrying member to compact position adjacent the chassis of the jack.

Among the objects of the present invention are to provide the foregoing type of jack with a chassis comprising a single integral casting for housing the mechanism for actuating the load-lifting member to raised and lowered position and for forming a mounting for the casters or wheels of the jack; to provide a jack of the foregoing character wherein the main or front wheels are tiltable with respect to the chassis, and about the longitudinal horizontal axis of the chassis whereby the jack can accommodate itself to unevenness in the floor or roadway so as to minimize springing of the axle when the load is on the jack; to provide a jack of the foregoing character wherein the chassis is constructed to receive the mechanism for actuating the load lifting member and in such a manner that such mechanism can bodily be removed as a entirety or demounted from the chassis as a unit, and preferably by the loosening of a simple screw or other convenient fastening means; to provide an hydraulic jack of the foregoing character wherein the hydraulic unit is bodily removable from the chassis as a unit; to provide a jack of the foregoing character wherein the hydraulic unit is bodily removable from the jack as an entirety and wherein the chassis is likewise provided with means housing the spring actuator for returning the load-lifting member to lowered position, which spring actuator is disposed in direct line with the plunger of the hydraulic unit and extends longitudinally of and is enclosed by the chassis whereby to protect both the spring and hydraulic unit from dirt and water and from injurious blows or knocks; to provide a chassis of the foregoing character wherein the actuator for the load-lifting member, which is manually operable, may be conveniently shifted angularly with respect to the chassis whereby to permit the operation of the manual actuator to raise the load in a position such that the manual actuator may swing in a plane parallel to or substantially parallel to the floor or ground so that when the jack is inserted well beneath a car or the like, ample movement is provided for the reciprocation or operation of the manually operable member; to provide an hydraulically actuated jack of the foregoing character wherein the hydraulic unit is positioned at one end of the longitudinally extending jack and is operable by means of an extended manually operable member, the hydraulic unit and/or the manually actuatable member being constructed and arranged so that the actuator may be turned so that it may be reciprocable in a plurality of planes including a vertical plane and including planes angularly disposed with respect to the vertical, whereby to facilitate the operation of the jack when the jack is inserted under low objects; to provide a hydraulically operated jack of the foregoing character wherein means is provided so that the actuating member and/or hydraulic unit may be turned only in one direction whereby to maintain the liquid reservoir of the hydraulic jack constantly in a predetermined position whereby the liquid flow to the hydraulic system is always assured in any angular operating position of the handle of the actuating member; to provide an hydraulically actuated jack of the foregoing character wherein the hydraulic unit is demountable as a unit from the chassis and operatively carries a part of the manually actuatable member including the handle, together with means whereby the handle may be dismounted from the remaining portions of the actuator; to provide an hydraulic jack of the foregoing character having the improved connections between the actuating handle and the hydraulic unit itself whereby to permit the reciprocation of the piston of the hydraulically actuated unit as well as the manual operation of the valve controlling the liquid passages of the hydraulic unit in combination with means whereby the hydraulic unit may be turned relatively to the chassis so that the unit may be operable in various positions angularly disposed with respect to the chassis; to provide an hydraulically operated jack of the foregoing character wherein the load-raising member is pivotally mounted on the chassis and includes an element positioned adjacent the plunger of the hydraulic unit, and wherein the spring for returning the load-raising member to lowered position is housed within the chassis in line with the plunger of the hydraulic unit; to provide a jack of the foregoing character wherein the load-lifting member forms a housing for the underpart of the chassis so that as the load-lifting member collapses it protects the interior portion or parts of the underlying chassis from dirt and water; to provide an hydraulic jack of the foregoing character wherein the hydraulic unit swivels in the chassis so that it can be actuated by a reciprocation of the manual actuator in a horizontal plane and also in a vertical plane; to provide a jack of the foregoing character wherein the chassis is provided as a unitary casting which houses the spring and acts as a bearing for the front axle, the bearing being provided with a central portion forming a pivot for the load-raising and lowering member and forming a housing for the actuating plunger and the detachable hydraulic unit, and likewise carrying additional brackets for the rear swiveled casters; to provide these and other objects of invention as will be apparent from a perusal of the following specification when taken in connection with the accompanying drawings, wherein:

Figure 1 is a perspective view of the improved dolly or service jack.

Figure 2 is a view showing the hydraulic unit turned ninety degrees so that the manual actuator can be reciprocated in a horizontal plane, as for instance when the jack is positioned under an automobile so that vertical reciprocation of the manual actuator would not be impeded or restricted.

Figure 3 are perspective views of the various main parts that go to make up the jack, which include the main body portion, the lifting member and the hydraulic cylinder.

Figure 4 is a plan view of the jack as shown in Figure 5, with a portion of the upper housing broken away to show more clearly the construction.

Figure 5 is a longitudinal sectional view taken on the line 5—5 of Figure 4.

Figure 6 is a view similar to Figure 5, showing the lifting portion of the jack in a raised position with the right hand portion broken away.

Figure 7 is a view showing the swiveled position of the front axle and wheels to accommodate unevennesses in the floor.

Figure 8 is a view from the operator's end of the jack showing a portion of the left hand side in cross section.

Figure 9 is a section taken on the line 9—9 of Figure 5.

Figure 10 is a section taken on the line 10—10 of Figure 1.

Figure 11 is a section taken on the line 11—11 of Figure 10.

Figure 12 is a section taken on the line 12—12 of Figure 10.

Referring now to the drawings in detail, the invention comprises a dolly, service, floor or wheel jack comprising a chassis 2 formed as a single integral casting. The chassis 2 has a substantially centrally disposed interior compartment 4 open on the bottom and top. The top of this compartment 4 has a downwardly tapered front surface 6 for shedding water and dirt. Underlying this top 6, the interior compartment extends forwardly of the jack to provide a cylindrical bore 8, the bottom portions of which include two spaced apart downwardly projecting semi-annular supports 10 and 12 to receive the actuator or hydraulic unit hereinafter described. This compartment 4 extends rearwardly of the housing, as shown at 14 and 16 in Figure 5, and an intermediate portion of the compartment is provided with a support 18 to receive and support a spring housing 20 hereinafter referred to. The forward end 22 of the chassis extends forwardly and is provided with a relatively smaller longitudinally extending bore 24. This forward portion 22 is preferably formed streamlined and is completely covered over in order to shed water and dirt. The opposite end of the body portion 2 of the jack, rearwardly of the downwardly slanting top portion 6, is provided with extending integral shoulders 26 and 28 forming supports for the swivel casters 30 and 32 which are mounted to swivel about vertical axes.

The jack is provided with a front or main axle 34 carrying the usual type of wheels 36 and 38 which are adapted to rotate about the ends of this front axle 34. The front axle is provided with means whereby it may swivel about a longitudinal axis of the jack which as shown is about a horizontal axis. To this end the front end is provided with a lateral extension 40 which is adapted to turn in the bore 24 of the chassis. This extension is provided with an annular groove 42 to receive a set screw 44 to hold the axle in position while permitting its turning relatively to the chassis but retaining it from removal except when it is desired to demount the front axle from the chassis. It will thus be seen, with respect to Figure 7, that whenever there are unevennesses in the floor the front axle of the jack may accommodate itself to such unevennesses without transmitting the strain to the axle when the jack is subjected to a heavy load.

Means is provided for supporting the load comprising a load-lifting lever 46 shown in perspective in Figure 3. This member is pivoted to the chassis by means of the cross pin 48 which passes through the bore 50 in the load-lifting member and through registering holes 52 and 54 in the chassis 2. At one end the load-lifting member is provided with a pair of spaced ears 56 and 58 having registering holes 60 and 62, which holes are adapted to support a cross pin 64 to support the load-lifting saddle 66. This in turn carries a swivel mounted, roughened, circular seat 68 mounted upon a central swivel 70 to receive and grip the work. The member 66 has two downwardly extending ears 72, perforated to receive two cross pins 74 which pivotally connect with a link 76, the opposite end of the link being pivotally connected as at 78 with the main casting 18, see Figures 4 and 5, whereby the load-receiving member 68 is retained in a horizontal position with respect to the jack during the rise and fall of the load-lifting member.

The bottom forward portion of the load-raising member is provided with a forward bifurcated extension 80 having two registering bores 82 and 84 receiving cross pin 86 and a link 88 which in turn is pivotally connected as at 90 to the one end of the spring retaining housing 20. The compression spring 92 is housed within this housing 20 and has its opposite end confined in a depressed seat 94 in one end of the chassis extension 22.

The cross pin 86 in addition supports a pair of spacing rolls 96 and 98 which form a surface against which the plunger 100 of the actuator is adapted to operate to raise the load. By this construction it will be noted that the plunger moves forwardly in the direct line of the horizontal axis of the spring 92 and in line with the longitudinal axis of the chassis.

The actuator is constructed so that it may be removed as a unit or as an entirety from the chassis. To this end I prefer to use an hydraulic actuating unit, and to mount the unit so that it not only may be withdrawn or demounted entirely from the chassis for repair, replacement or otherwise, but also that it may swivel or turn about a horizontal axis, and preferably about the longitudinal axis of the chassis, as shown in Figure 2, so that the actuating mechanism for raising the load-carrying member may be operated by the manual actuator hereinafter disclosed, not only from a vertical position but from a horizontal position of the manual actuator, and in any intermediate position between the same, so that when the jack is placed well beneath an automobile and insufficient space remains for actuating the manual actuator of the jack in a vertical plane, the hydraulic or other unit may be turned angularly with respect to the chassis and the manual actuator shifted or reciprocated in a plane parallel with the space intervening between the floor and the low point of the body or car being raised. In this connection if the actuator be an hydraulic unit, as distinct from a mechanical unit, means is provided so that the hydraulic unit may be turned only in one direction so that the liquid-holding reservoir is always positioned to maintain the liquid conduits full of liquid in any operating position of the jack. This means does not prevent the swivel turning of the jack in the proper direction. In carrying out the foregoing, I provide the hydraulically actuated unit shown in Figures 10, 11 and 12 of the drawings comprising a main cylindrical casting 102 forming a force fit with the main body 104 of the unit, which latter body includes the liquid reservoir 106, the cylinder 108 for the hydraulic piston 110, the bore 112 for the valve operating rod 114, and the liquid connections 116, 118, 120, 122 and 124 interconnecting the main cylinder 126 housed within the cylindrical portion 102 of the unit. This cylinder 126 has its ends externally threaded as at 128 to cooperate with internally threaded wall portions 130 and 132 on the cylindrical portion 102 and the main body portion 104. The plunger 100 of the hydraulic unit has any type of piston head 136 adapted to make fluid contact with the inner wall of the cylinder 126 which comprises a flexible leather washer 138 held in position by the nut and washer 140. The usual type of ball valves 142 and 144 and intervening spring 146 serve to control the fluid passage, as is well known in the art. Plugs 148 close these passageways and a second plug 150 permits filling and closure of the liquid reservoir 106.

The piston 110 which is reciprocably mounted in the cylinder 108 has the piston head 152 which comprises the leather washer 154 and the retaining nut 156. The opposite end of the piston 110 is provided with an annular recess 158 which cooperates with a split ring 160 which in turn retains a spring ferrule 162. This latter encloses a compression spring 164, which is positioned on a seat 166. The function of this spring is to project the piston 110 outwardly from the cylinder 108 when the manually actuated handle 168 is raised. This manual actuator comprises a cylindrical housing 170, with furcations 172 having registering bores pivoted on cross pins 174 mounted on the main body portion 104 whereby the manual actuator is swiveled with respect to the body portion of the chassis 2. This sleeve 170 of the manual actuator carries two projections 176 carrying cross pin 178 to support a roller 180 which is adapted to roll against the actuating end of the high pressure piston 110 of the hydraulic unit.

Means is provided for operating one of the valve members of the hydraulic unit from the manual actuator to permit the release of the fluid from the ram or plunger cylinder into the hydraulic reservoir when it is desired to lower the load-carrying member. In order to carry this out, a valve comprising a ball 182 is adapted to position itself on a seat 184 which is connected with an opening 188 into the main hydraulic cylinder 126. The ball 182 is controlled by the threaded rod 114, which when in operation is tightly pressed against the ball 182 to close the opening 188. The control of the rod 114 is accomplished by the manual rotation of the handle 168 which handle 168 is held in the housing 170. The handle 168 is preferably a hollow bar having at its inward end a fitting 190, that is press fitted into the hollow end of the operating handle 168. The fitting in turn is provided with a hexagonal hole 192 adapted to receive a hexagonal rod 194 which has on its outwardly extending end a universal joint 196. The other end of the cooperating portion of the universal joint 198 is fixed to the control rod 114. Cross pin 200 interconnects the members 196 and 198 so that upon rotating of the handle 168 it automatically rotates the member 190 and through the hexagonal connection 192 and 194 will rotate the universal joint to unscrew the rod 114 and allow the ball 182 to be projected from its seat by the force of fluid, which will flow back into the fluid reservoir through the passage 202.

The handle 168 and the fitting 190 are held in the housing 170 by the screw 204 which has a threaded portion 206 and a reduced end portion 208 which cooperates with an annular groove 210. The function of the screw 204 is to retain the handle 168 in the housing 170. In short, the handle 168 may be removed or demounted from its socket 170 by releasing the screw 204, while at the same time it serves to hold the handle 168 in the cylindrical housing 170 but permits it to rotate to actuate the member 190 which is slidably fixed to the hexagonal bar 194.

Means is provided so that the hydraulic unit may turn ninety degrees only in one direction whereby the reservoir 106 may not be turned to a position such that it will serve to maintain the liquid passages full of liquid. For instance, referring to Figures 10 and 11, stop means is provided in the form of a pin 212 which threads into a bore 214 in the main housing 2, see Figures 3 and 10. This pin strikes another pin 216 projecting upwardly from the housing 104 and which pin will prevent the hydraulic unit from turning in the bore in an opposite direction.

The cylindrical head 102 that encloses the hydraulic unit 126 has formed on its forward end the conical shaped head 218 having an annular groove 220 adapted to cooperate with a set screw 222, as shown in Figure 4. This set screw 222 positions the hydraulic cylinder housing 102 with respect to the main housing 2 of the jack and prevents it from becoming separated when the jack is operated, but will also allow the rotation of the cylindrical housing 102 with respect to the main jack housing 2. When the cylindrical portion 102 which houses the hydraulic mechanism is to be removed from the main housing of the jack, the set screw 222 is removed sufficiently from out of the groove 220 to allow the removal of the cylindrical portion 102 with the main body 104 which encloses the hydraulic mechanism.

Therefore if any of the hydraulic mechanism becomes out of order and needs replacements or repairs, the removable unit may be disassembled from the main portion of the jack and shipped back to the factory to have it again put into serviceable condition. It will also be understood that the handle portion 168 can also be removed by the set screw 204 hereinbefore described, and therefore the only portions of the jack that might become out of order can be shipped with a very small amount of disassembly.

Referring to Figure 8 of the drawings, the two shoulder members 30 and 32 comprise a housing for the vertical stem portion 224 of the caster-supporting member 226. This stem portion 224 is held in the shoulder housings 30 and 32 by a set screw 228 adapted to cooperate with an annular groove 230 formed on the stem 224, the set screw 228 retaining the stem 224 in position with respect to the shoulder 30, but allowing the pivoting of the caster-supporting member 226. The two forward casters 232 and 234 are supported on the cross pins 236 and 238.

The operation of the jack is as follows: Upon raising and lowering the handle 168, the plunger 110 is raised and lowered by means of its contact with the roller 180 which is supported on the sleeve 170 and which is raised and lowered by means of the handle 168. Upon reciprocation of the plunger 110 it draws fluid through the passage 122 from the reservoir 106, past the ball valve 142, and up into the plunger cylinder 108, the plunger being raised by the spring 164 which causes the plunger head to follow the roller 180 upwardly as far as the operator raises the handle 168. Upon downward motion of the handle 168 by the operator, the roller 180 forces the plunger piston 110 into the cylinder 108 to force the fluid from the cylinder 108 through the opening 124 into the passageway 120 past the ball valve 144 and through the passageway 118 into the ram cylinder 126 to force the piston 136 to move outwardly or to the left, as shown in Figure 10. The end of the piston 136 being part of the ram 100 contacts the rollers 96 and 98 to force the load-raising member 46 to pivot about the cross pin 48 and thereby to raise the load-lifting end or saddle member 68. In so doing, the ram 100 forces the link 88 to move or to shift the spring housing 20 to compress the spring 92 against its seat 94, the spring being more compressed as the load-receiving end 68 is raised. When the jack is to be lowered the handle member 168 is rotated to unscrew the rod 114 and release the ball 182 from its seat 184, thereby allowing the fluid in the cylinder to be released through the opening 202 back into the reservoir. By releasing the fluid back into the reservoir it allows the piston 136 to be moved to the right as shown in Figure 10, which is caused by the built up pressure in the spring 92 which has been under compression and therefore upon expansion it will force the piston back into the cylinder and thereby force the fluid back into the reservoir. In order to again operate the jack the handle 168 must be turned in an opposite direction in order to again force the ball 182 to close the opening 188 and prevent the passage of the fluid through the openings 188 and 202.

Obviously the invention is not limited to the specific details of construction disclosed herein but is capable of other modifications and changes without departing from the spirit and scope of the appended claims.

The invention is hereby claimed as follows:

1. A dolly or service jack comprising a chassis formed of a single integral base casting provided with a relatively long, longitudinally extending central bore forming a bearing, a front axle having a centrally disposed, relatively long, right angled extension turnably mounted in the bore of the casting and forming the sole connection between said front axle and said base casting, wheels on the ends of said axle, a saddle carrying arm pivotally mounted on said base casting, and actuating mechanism mounted on said base casting to actuate said arm to raise the arm.

2. A dolly or service jack comprising an elongated, substantially horizontally disposed chassis, a load-carrying member pivotally mounted thereon, an hydraulic actuating unit including a ram cylinder and ram, a liquid reservoir, a high pressure pump and piston, and a relief valve mechanism for actuating said load-carrying member mounted at one end of said chassis and having an actuated portion positioned to operate upon said load-carrying member to raise the same relatively to the chassis, said hydraulic unit being bodily demountable as an entirety from said chassis.

3. A dolly or service jack comprising a portable, substantially horizontally disposed chassis, a load-carrying member shiftably mounted thereon including a part positioned relatively to said chassis so as to be actuatable by a ram, a manually operable actuator, and an hydraulic operating unit demountably assembled on said chassis and including a ram disposed in position to actuate said part of the load-carrying member and raise said load-carrying member on operation of said manual actuator, said hydraulic unit being demountable as an entirety from said chassis.

4. A dolly or service jack comprising a portable, substantially horizontally disposed chassis, a load-carrying member shiftably mounted thereon, a manual actuator, said chassis having a bore, one end of which registers with an actuatable portion of said load-carrying member, and an hydraulic unit having a barrel portion demountably carried in said bore, said barrel portion including a reciprocable plunger positioned to contact said actuatable portion to raise the load-carrying member and including a piston adapted to be actuated by said manual actuator, said hydraulic unit being demountable as an entirety from said bore of the chassis.

5. A dolly jack having an elongated, relatively low chassis, a load-lifting member shiftably mounted thereon to lift a load, an hydraulic unit comprising a ram and a piston, said unit being demountable bodily and as an entirety from said chassis, said hydraulic unit when in mounted position on said chassis having its ram in actuating position relatively to said shiftable load-carrying member to raise the latter, and a manual actuator for operating said piston.

6. A dolly or service jack comprising a portable, substantially horizontally disposed chassis, a load-carrying member shiftably mounted thereon, a manual actuator, said chassis having a bore, one end of which registers with an actuatable portion of said load-carrying member, and an hydraulic unit having a barrel portion demountably carried in said bore, said barrel portion including a reciprocable plunger positioned to contact said actuatable portion to raise the load-carrying member and including a piston adapted to be actuated by said manual actuator, said hydraulic unit being demountable as an entirety from said bore of the chassis, said manual actuator being carried by said hydraulic unit.

7. A dolly or service jack comprising a portable, substantially horizontally disposed chassis, a load-carrying member shiftably mounted thereon, a manual actuator, said chassis having a bore, one end of which registers with an actuatable portion of said load-carrying member, and an hydraulic unit having a barrel portion demountably carried in said bore, said barrel portion including a reciprocable plunger positioned to contact said actuatable portion to raise the load-carrying member and including a piston adapted to be actuated by said manual actuator, said hydraulic unit being demountable as an entirety from said bore of the chassis, said manual actuator including a member for actuating said piston, a valve actuating member and a handle, said handle being detachable from said manual actuator, and said manual actuator being otherwise mounted upon and removable with said hydraulic unit.

8. A dolly jack comprising a chassis, a load lifting member shiftably mounted thereon to lift a load, and an hydraulic unit including an actuatable member shiftably mounted on said hydraulic unit, said hydraulic unit including a ram positioned to actuate the load lifting member to lift the same and a piston operable by movement of said actuator to actuate the ram, said actuator being angularly turnable with respect to the chassis to permit the actuation of the actuator both in a vertical plane and in a plane angularly disposed with respect to the vertical plane.

9. A dolly jack comprising a chassis, a load lifting member shiftably mounted thereon, an actuator having a part adapted to operate the load lifting member to lift a load and pivoted to turn about the longitudinal axis of the chassis, and an actuator, said actuator having a manually operable handle angularly turnable about an axis generally transverse to the longitudinal axis of the jack chassis and to lift the load on movement of the handle both in a vertical plane and also in a plane angularly disposed with respect thereto.

10. A dolly jack comprising a chassis, a load lifting member shiftably mounted thereon for lifting a load, an hydraulic unit turnably mounted on said chassis and having a ram hydraulically projectable to operate the load lifting member and having a piston, and a manual actuator adapted upon reciprocation to actuate the piston, said actuator and hydraulic unit being turnable angularly to permit the actuator to be reciprocated in a vertical plane or in a more or less horizontal plane.

11. In a dolly jack the combination of a chassis, a load lifting member mounted thereon, an hydraulic unit turnably mounted on said chassis about a substantially horizontal axis and including a ram operable at any turn in position of the unit for actuating the load lifting member and including a piston, and a manually operable handle pivotally connected to said unit and having a portion to operate said piston on reciprocation of said actuator.

12. In a dolly jack the combination of a chassis, a load lifting member mounted thereon, an hydraulic unit turnably mounted on said chassis about a substantially horizontal axis and including a ram operable at any turn in position of the unit for actuating the load lifting member and including a piston, and a manually operable handle pivotally connected to said unit and having a portion to operate said piston on reciprocation of said actuator, said hydraulic unit and actuator being turnable together substantially 90° whereby said actuator may be reciprocated in a vertical plane or in a substantially horizontal plane to actuate the ram.

13. In a dolly jack the combination of a chassis, a load lifting member mounted thereon, an hydraulic unit turnably mounted on said chassis about a substantially horizontal axis and including a ram operable at any turn in position of the unit for actuating the load lifting member and including a piston, and a manually operable handle pivotally connected to said unit and having a portion whereby on reciprocation of said actuator to operate said piston, said hydraulic unit including a reservoir containing a quantity of liquid and intercommunicating passages therebetween forming an operating medium between the piston and the ram and means preventing the turning of said unit in a direction which will preclude the liquid in said reservoir filling the interconnecting passages between said piston and ram.

14. In a dolly jack the combination of an elongated chassis, a load lifting member shiftably mounted thereon, said chassis at one end forming a bearing, an hydraulic unit turnably mounted in said bearing, said hydraulic unit including an actuatable ram so disposed in any turned position of the unit as to actuate the load lifting member while permitting angular movement of the hydraulic unit in its bearing on the chassis, said hydraulic unit likewise including a housing portion including a reservoir, a piston and a valve, and interconnecting fluid passages between the reservoir, the piston and the ram, an actuator pivotally mounted on said unit extension and having a portion to actuate said piston on reciprocation of said actuator, and shiftable means carried by said actuator for actuating said valve operating member, said hydraulic unit and actuator being turnable angularly with respect to the chassis whereby to permit actuation of said actuator in a plurality of planes with respect to vertical and horizontal planes.

15. In a dolly jack the combination of a chassis, a load lifting member shiftably mounted thereon, said chassis at one end forming a bearing, an hydraulic unit turnably mounted in said bearing, said hydraulic unit including an actuatable ram so disposed in any turned position of the unit as to actuate the load lifting member while permitting angular movement of the hydraulic unit in its bearing on the chassis, said hydraulic unit likewise including a housing portion including a reservoir, a piston and a valve, and interconnecting fluid passages between the reservoir, the piston and the ram, an actuator pivotally mounted on said unit extension and having a portion to actuate said piston on reciprocation of said actuator, shiftable means carried by said actuator for actuating said valve operating member, said hydraulic unit and actuator being shiftable angularly whereby said actuator may be reciprocated in a vertical plane or in a horizontal plane and means associated with the turnable hydraulic unit and the chassis whereby said hydraulic unit can be angularly turned in one direction only so as to maintain the internal liquid passages of the hydraulic unit full of liquid from the liquid reservoir of the hydraulic unit.

16. In a dolly jack the combination of a chassis, a load lifting member shiftably mounted thereon, said chassis at one end forming a bearing, an hydraulic unit turnably mounted in said bearing, said hydraulic unit including an actuatable ram so disposed in any turned position of the unit as to actuate the load lifting member while permitting angular movement of the hydraulic unit in its bearing on the chassis, said hydraulic unit likewise including a housing portion including a reservoir, a piston and a valve, and interconnecting fluid passages between the reservoir, the piston and the ram, an actuator pivotally mounted on said housing, said actuator including a socket portion and a handle therefor, said handle being turnable about the longitudinal axis of the handle, and a splined connection between said handle and said valve operating rod including a connection between said handle and said valve operating rod including mechanism to permit the turning and reciprocation of said handle while causing operation of said valve rod by the turning of said handle, said socket including an actuator positioned adjacent the operating head of the piston, said socket and said handle being turnable as a unit about the longitudinal axis of said ram whereby to permit actuation of said handle both in a vertical plane and in a substantially horizontal plane.

17. A dolly jack comprising a chassis, a load lifting member having a portion adapted to rise from said chassis to lift a load, the one end of said chassis having an opening therein forming a bearing, an hydraulic unit turnably mounted in said bearing, said unit including an elongated ram extending longitudinally of the chassis in position to actuate a portion of the load lifting member, and means for holding said unit turnably in position on said chassis, said means permitting angular movement of said unit, and a manual actuator shiftably mounted on said unit, said actuator being turnable with said unit whereby said actuator may be reciprocated both in a vertical plane and in a substantially horizontal plane to actuate the ram of the hydraulic unit.

18. A dolly or service jack comprising a chassis having a base casting provided with a relatively long, longitudinally extending central bore forming a bearing, a front axle having a centrally disposed, right angled extension turnably mounted in the bore on said casting and forming the sole connection between said front axle and said base casting, said axle extending substantially beyond the lateral planes of said base casting, wheels on the ends of said axle beyond the planes of said casting, a saddle-carrying arm pivotally mounted on said casting, and actuating mechanism mounted on said base casting to actuate the arm to raise the arm.

19. An hydraulic jack comprising a chassis, a lifting member shiftably mounted on said chassis, an hydraulic unit mounted on said chassis and having a ram cylinder, a ram in said cylinder for operating said lifting member, a liquid reservoir, a pump cylinder connecting said ram cylinder with said reservoir, valve means for said connection, a pump piston reciprocable in said pump cylinder, said piston having a free end forming a head extending exteriorly of said unit, spring means normally urging said piston outwardly of said cylinder, an actuator pivotally connected to said unit, said actuator having a friction roller adapted freely to roll upon said outwardly extending piston head, said roller having no connection with said piston head.

20. An hydraulic jack comprising a chassis, a lifting member shiftably mounted on said chassis, an hydraulic unit mounted on said chassis and having a ram cylinder, a ram in said cylinder for operating said lifting member, a liquid reservoir, a pump cylinder connecting said ram cylinder with said reservoir, valve means for said connection, a pump piston reciprocable in said pump cylinder, said piston having a free end forming a head extending exteriorly of said unit, a spring retainer carried by said head, a spring disposed between said retainer and a shoulder portion of said unit, said piston head providing a relatively extended end surface, an actuator oscillatably mounted relatively to said unit and having an extension provided with an anti-friction means freely engaging said head to move along the extended surface of said head on oscillation of said actuator.

21. An hydraulic jack comprising a chassis, a lifting member shiftably mounted on said chassis for elevation with respect thereto, an hydraulic unit mounted on said chassis including a ram cylinder and ram for actuating said lifting member, a liquid reservoir, a pump cylinder connecting said ram cylinder with said reservoir, valve means for said connection, a pump piston reciprocable in said pump cylinder, and a by-pass valve for passing liquid from said ram cylinder back into said reservoir, said piston having a free end forming a head extending exteriorly of said unit, resilient means for normally urging said piston outwardly of said cylinder, an actuator oscillatably mounted relatively to said unit and actuatably connected to said relief valve for opening said relief valve, said actuator having means for shifting said piston inwardly relatively to the pump cylinder.

22. An hydraulic jack comprising an elongated chassis having an elongated, centrally disposed bore concentrically formed about the longitudinal axis of the chassis, an hydraulic unit mounted in one end of the bore and having a ram extending inwardly of the bore toward the other end of the bore, a lifting member pivotally mounted on the chassis and having a portion provided with a friction roller depending into the bore to intersect the axis of reciprocation of the ram, an elongated shell mounted in said bore and having a pivotal connection with the depending portion of said lifting member, a spring in said shell and having a free end engaging a wall of the chassis in the ram of said bore, whereby said spring tends to expand in the line of said bore to press said lifting mechanism outwardly so as normally to roll said lifting mechanism toward the chassis, and hydraulic means for actuating said ram to raise said lifting member.

23. An hydraulic jack comprising an elongated chassis having an elongated, centrally disposed bore concentrically formed about the longitudinal axis of the chassis, an hydraulic unit mounted in one end of the bore and having a ram extending inwardly of the bore toward the other end of the bore, a lifting member pivotally mounted on the chassis and having a portion provided with a friction roller depending into the bore to intersect the axis of reciprocation of the ram, an elongated shell mounted in said bore and having a pivotal connection with the depending portion of said lifting member, a spring in said shell and having a free end engaging a wall of the chassis in the ram of said bore, whereby said spring tends to expand in the line of said bore to press said lifting mechanism outwardly so as normally to lower said lifting mechanism toward the chassis, and hydraulic means for actuating said ram to raise said lifting member, the end of said shell in the extreme raised position of said lifting member contacting the wall of said chassis whereby to limit the upper position of said lifting member.

24. An hydraulic jack comprising an elongated chassis having an internal chamber extending longitudinally which extends to an open end of the chassis, a lifting member pivoted to said chassis and having a portion depending into said opening, an elongated hydraulic unit having a portion mounted in said opening comprising a ram cylinder and ram, a portion of said unit projecting outwardly through the open end of the chassis and the ram of the unit extending toward and adjacent the depending portion of said lifting member, the portion of said unit extending exteriorly of said chassis including a liquid reservoir, a high pressure pump cylinder and piston and a by-pass valve, there being valve means for interconnecting the reservoir with the pump chamber and with the ram cylinder, and said by-pass valve controlling communication between said ram cylinder and said reservoir, and means associated with the exteriorly projecting end of said unit for operating said pump piston and said by-pass valve.

25. An hydraulic jack comprising an elongated chassis having an internal chamber extending longitudinally which extends to an open end of the chassis, a lifting member pivoted to said chassis and having a portion depending into said opening, an elongated hydraulic unit having a portion mounted in said opening comprising a ram cylinder and ram, a portion of said unit projecting outwardly through the open end of the chassis and the ram of the unit extending toward and adjacent the depending portion of said lifting member, the portion of said unit extending exteriorly of said chassis including a liquid reservoir, a high pressure pump cylinder and piston and a by-pass valve, there being valve means for interconnecting the reservoir with the pump chamber and with the ram cylinder, and said by-pass valve controlling communication between said ram cylinder and said reservoir, and means associated with the exteriorly projecting end of said unit for operating said pump piston and said by-pass valve, said unit being removable as an entirety endwise through the open end of said chassis, there being releasable means to hold said unit assembled in said opening in said chassis in position whereby said ram is adapted to operate said depending portion of said lifting member, and whereby said actuating means for said pump and said by-pass are accessible exteriorly of said chassis.

26. An hydraulic jack comprising a chassis having a recess provided with circular wall portions providing a bearing, said chassis having an open end communicating with said bearing, a lifting member shiftably mounted on said chassis and having an actuating part depending into said chamber, an hydraulic unit having arcuate peripheral wall portions turnably disposed in said bearing, said unit including a ram cylinder and a ram movable therein, the end of the ram projecting into the chamber adjacent said depending actuating part of said lifting member, said hydraulic unit including portions projecting through the open end of said chassis and connecting portions disposed externally of said chassis beyond the end thereof, said externally projecting portions including a liquid reservoir, a high pressure pump cylinder and piston and by-pass valve, said projecting portion including valve means for controlling the passage of said liquid from said reservoir to said pump, and to said ram cylinder, and said projecting portion including means whereby said by-pass valve controls the relief of liquid from said ram cylinder to said reservoir, and means extending outwardly of said projecting portion of said unit for actuating said pump piston, and said by-pass valve, said hydraulic unit being turnable in its bearing in the chassis to facilitate the operation of said pump piston.

27. An hydraulic jack comprising a chassis having a recess provided with circular wall portions providing a bearing, said chassis having an open end communicating with said bearing, a lifting member shiftably mounted on said chassis and having an actuating part depending into said chamber, an hydraulic unit having arcuate peripheral wall portions turnably disposed in said bearing, said unit including a ram cylinder and a ram movable therein, the end of the ram projecting into the chamber adjacent said depending actuating part of said lifting member, said hydraulic unit including portions projecting through the open end of said chassis and connecting portions disposed externally of said chassis beyond the end thereof, said externally projecting portions including a liquid reservoir, a high pressure pump cylinder and piston, and a by-pass valve, said projecting portion including valve means for controlling the passage of said liquid from said reservoir to said pump, and to said ram cylinder, and said projecting portion including means whereby said by-pass valve controls the relief of liquid from said ram cylinder to said reservoir, and means extending outwardly of said projecting portion of said unit for actuating said pump piston, and said by-pass valve, said hydraulic unit being turnable in its bearing in the chassis to facilitate the operation of said pump piston, said hydraulic unit being detachable endwise through the opening of said chassis, and means for holding said unit in assembled relation while permitting turning of said hydraulic unit in said bearing.

JOSEPH J. MUELLER.